UNITED STATES PATENT OFFICE.

ALBERT E. THORNTON, OF ATLANTA, GEORGIA.

PROCESS OF TREATING OLEAGINOUS SEEDS FOR THE EXTRACTION OF OIL.

SPECIFICATION forming part of Letters Patent No. 312,674, dated February 24, 1885.

Application filed November 19, 1884. (No specimens.)

*To all whom it may concern:*

Be it known that I, ALBERT E. THORNTON, a citizen of the United States, residing at Atlanta, in the county of Fulton and State of Georgia, have invented certain new and useful Improvements in Processes of Treating Oleaginous Seeds for the Extraction of Oil; and I do hereby declare the following to be a full, clear, and exact description of the invention, such as will enable others skilled in the art to which it appertains to make and use the same.

The object of my invention is to improve the process of preparing oleaginous matter, such as seeds, and particularly cotton-seeds, the meal, or the refuse thereof, for extracting the oil which they contain, so that a greater yield of oil may be obtained, together with an improved quality of cotton-seed cake.

Heretofore cotton-seed meal has been subjected to many different processes for the purpose of preparing it for the press. Among others it has been treated with steam in a steam-heated vessel in order to moisten the meal and increase the flow of the oil. The seed has been moistened and heated by steam being introduced into the meal and made to surround the same, by the continuous application of steam until it was cooked or dried. The latter practice is objectionable, for the reason that the continuous admission of the steam into the body of the meal causes it to absorb too much moisture and prevents the proper cooking of the meal, as the meal absorbs the condensation of the steam, and thereby continues the moist condition thereof.

It has been proposed to subject the meal to the heat of steam applied directly thereto in one vessel to moisten it, and then transfer the heated meal to another vessel, where it is dried by heat applied to the vessel by means of a jacket filled with steam. This process is objectionable, for the reason that the heat imparted to the meal in the first vessel opens the oil-cells, which, by the transfer of the meal from one vessel to the other, are affected by their being exposed to the atmosphere, thus reducing the temperature and to a degree chilling the meal and retarding the action being produced upon it by the application of the heat of the steam thereto. Furthermore, by the transfer of the heated meal from one vessel to the other condensation of the steam contained in the heated mass is affected, which causes a loss of so much heat which should be utilized in the thorough cooking and drying of the meal. This transfer also results in great loss of time and an increased cost of handling the material.

According to the processes heretofore practiced, more moisture is taken up by the meal than is necessary to expand the cells. Some of the moisture is condensed within the meal, forming lumps and wet and pasty aggregations, which interfere with the subsequent extraction of the oil and prevent all of the oil from being expressed, thereby causing a smaller per cent. of ammonia to be contained in the same quantity of cake.

My process differs from all others that have preceded it in that I place the meal in a receptacle provided with suitable appliances for admitting steam directly to the mass of meal, and simultaneously therewith the body of meal has imparted to it the heat of steam contained in a jacket surrounding the receptacle containing the meal, thus at one operation imparting to the meal the moisture and heating effects of the steam by internal and external application thereto, which greatly facilitates the expansion of the particles and opens the oil-cells contained in the seed. When the meal has been sufficiently heated by this double application of the steam, that which flows into the mass thereof is cut off, while that which surrounds it is continued uninterruptedly until the entire mass is sufficiently cooked and the moisture evaporated therefrom, thus maintaining the same temperature of the meal throughout the entire process of its preparation for the press and one continuous action of the heat upon the oleaginous substance. I have found by long practice that the best results are obtained when the meal is all thoroughly permeated with steam, and all excess of moisture is subsequently expelled.

Neither the application of heat nor moisture alone is sufficient to bring the meal into the proper condition to secure the extraction of all of the oil. It is necessary for the moisture to be applied in the form of steam, and when the moisture has been applied the temperature of the mass must be retained at a steam heat until all excess of moisture is removed. If the meal is simply moistened with steam, even in a steam-chamber, it is found that some of the steam is unavoidably condensed within the meal, and to prevent this and to secure the perfectly uniform condition desired I place the meal in a vessel into which steam is admitted to moisten it, and at the same time surround the meal with the heat of steam contained in a jacket around the vessel containing the meal. When the proper degree of moisture has been absorbed by the meal to open the oil-cells, I cut off the steam which is flowing into the body of the meal and continue uninterruptedly the heat of the steam around the meal until it has been properly cooked or dried. I thus retain all of the heat imparted to the meal from the time it is first exposed to the steam, and therefore maintain the same temperature throughout the entire process of preparing it for the press.

In carrying out my invention I may make use of any approved form of apparatus for treating grain by steam that has a steam-jacket surrounding the receptacle or vessel which receives the grain, and means for introducing steam into the grain-receptacle, together with a stop-cock, by which the steam can be shut off from the interior of the receptacle. Stirrer-arms are also provided in such machines, to stir and mix the meal, and in some cases the steam for moistening the meal may be admitted through the arms of the stirring mechanism.

It is immaterial what form or arrangement of such an apparatus be used; but the steam must be shut off from the interior of the vessel—that is, the steam which is admitted to direct contact with the meal before the process is completed and the operation continued with the steam-jacket alone. The steam that is admitted into the interior of the vessel operates in the usual manner. It moistens the meal, expands and bursts the oil-cells, and is in part absorbed and taken up by the fiber of the meal. When this supply of steam is shut off, the action of the external steam within the jacket is still continued and the vessel is retained at a steam heat. All superfluous moisture held by the meal is driven off, and under the combined action of the stirrer mechanism and the steam heating-jacket the body of the meal becomes perfectly even and uniform, holding only enough moisture to expand the cells.

In the practice of my invention the steam flows into and through the jacket surrounding the receptacle to contain the meal continuously. Thus while the meal is being placed in the receptacle it is gradually heated by the heat of the jacket. When the receptacle is properly charged, the steam is admitted to the inside of the receptacle containing the meal. The steam which enters into the interior of the vessel is allowed to remain on for about five minutes, and is then shut off. The meal is then subjected to the cooking and drying action of the steam-jacket alone for about fifteen minutes, when the charge is ready to be removed and pressed. The top of the vessel is kept open, or provision is otherwise made by which the vapor driven off from the meal during the last stage of the process can escape. In practice the steam that heats the jacket is kept turned on all the time, and successive charges are treated, each occupying about twenty minutes.

It will be understood that the periods of time above named will vary with the amount of the charge, the condition of the meal, (some of which contains naturally more moisture than others,) and the temperature of the steam. If superheated steam is used for moistening the meal, less time will be required. I have generally used heaters which hold a charge of about one hundred pounds of meal. Incidentally, a saving of steam follows from the use of my process less being required than by the processes in common use.

The great improvement of my process over others heretofore used is best illustrated by the fact that cake or refuse meal which has been treated by such processes can be re-treated according to the above-described process, and sufficient oil obtained therefrom to make the same profitable.

Having thus described my invention, what I claim as new, and desire to secure by Letters Patent, is—

1. The process of treating oleaginous seed, the meal, or refuse thereof, which consists in subjecting it to the heat of steam by direct and indirect contact therewith, cutting off the steam applied directly thereto, and continuing the indirect or external application of the steam until it is properly cooked or dried, substantially as described.

2. The process of treating oleaginous matter—such as seed, the meal, or refuse thereof—which consists, first, in applying steam directly and indirectly to said matter; second, in cutting off the direct supply, and, third, in maintaining the temperature of the matter by continuing the indirect supply of heat until the matter is properly cooked or dried, substantially as described.

3. The process of treating oleaginous matter preparatory to extracting the oil therefrom, which consists in conducting steam simultaneously into and around a mass or body of said matter, cutting off the supply of steam into the body of the matter, and uninterruptedly continuing the supply of steam around the matter until it is properly cooked or dried, substantially as described.

4. The process of treating oleaginous matter—such as seed, the meal, or the refuse thereof—which consists, first, in gradually warming the meal as it is being placed in the vessel in which it is treated by the heat of steam surrounding said vessel; second, in heating and moistening the meal by the direct and indirect application of steam thereto, and, third, in cutting off the direct supply and continuing uninterruptedly the indirect or external supply until the meal is properly cooked or dried, substantially as described.

In testimony whereof I affix my signature in presence of two witnesses.

ALBERT E. THORNTON.

Witnesses:
J. G. ZACHRY,
EMMA M. GILLETT.